Dec. 31, 1940.     H. HARDINGE     2,226,974
SEDIMENTATION APPARATUS
Filed Jan. 16, 1936     5 Sheets-Sheet 1

HARLOWE HARDINGE
By Malcolm F. Gannett
Attorney

Dec. 31, 1940.                H. HARDINGE                2,226,974
                         SEDIMENTATION APPARATUS
                         Filed Jan. 16, 1936         5 Sheets-Sheet 3

Inventor
HARLOWE HARDINGE
By Malcolm F. Gannett
Attorney

Dec. 31, 1940.　　　　H. HARDINGE　　　　2,226,974
SEDIMENTATION APPARATUS
Filed Jan. 16, 1936　　　5 Sheets-Sheet 4

Inventor
HARLOWE HARDINGE
By Malcolm N. Gaunett
Attorney

Dec. 31, 1940.   H. HARDINGE   2,226,974
SEDIMENTATION APPARATUS
Filed Jan. 16, 1936   5 Sheets-Sheet 5

Inventor
HARLOWE HARDINGE
By Malcolm F. Gannett
Attorney

Patented Dec. 31, 1940

2,226,974

UNITED STATES PATENT OFFICE 2,226,974

SEDIMENTATION APPARATUS

Harlowe Hardinge, York, Pa., assignor to Hardinge Company, Incorporated, York, Pa., a corporation of New York Application January 16, 1936, Serial No. 59,353

6 Claims. (Cl. 210—55)

This invention relates to sedimentation apparatus of the type of thickeners or clarifiers in which solids suspended in liquids are settled to the bottom of the apparatus by sedimentation, wherein the settled solids in the form of sludge are raked to a central sludge discharge. The rakes are carried by rake arms which are propelled from a rotatable vertical support. More particularly the invention relates to the construction of the support mechanism for the rake arms, so that the rakes can be lifted from the sludge in the bottom of the apparatus when said rakes encounter an obstruction in the sludge.

An object of the invention is to provide an improved sedimentation apparatus in which the sludge discharge rakes are movably suspended from the driving mechanism.

Another object of the invention is to provide an improved means for supporting the sludge discharge rakes from a single bull ring or wheel rotatably mounted in a framework of light construction.

Another object of the invention is to provide an improved sedimentation apparatus in which the sludge discharge rakes are flexibly suspended from their rotating mechanism in such a manner that said rakes are automatically raised above the bed of sludge in the apparatus when the rotating mechanism is overloaded.

Another object of the invention is to provide an improved sedimentation apparatus of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In previous practice, sedimentation apparatus of the type of the present invention were usually provided with two bearings, one above and one below the driving mechanism, or both below, so spaced apart that the shaft was held rigid vertically and rotated around a thrust bearing. When it was desired to raise the sludge discharge rakes and their operating mechanism, the shaft was pulled up through the main drive gear along a sliding keyway. The difficulty encountered by such practice was that the pressure against the keyway sometimes became so excessive that it required a great deal of force to raise the mechanism, particularly when the mechanism was loaded, and the designs were such that oversize shafts were necessarily employed in order to obtain the proper amount of strength. According to the present invention no shaft is required. In its place I utilize a torque tube or pipe.

Figure 1:
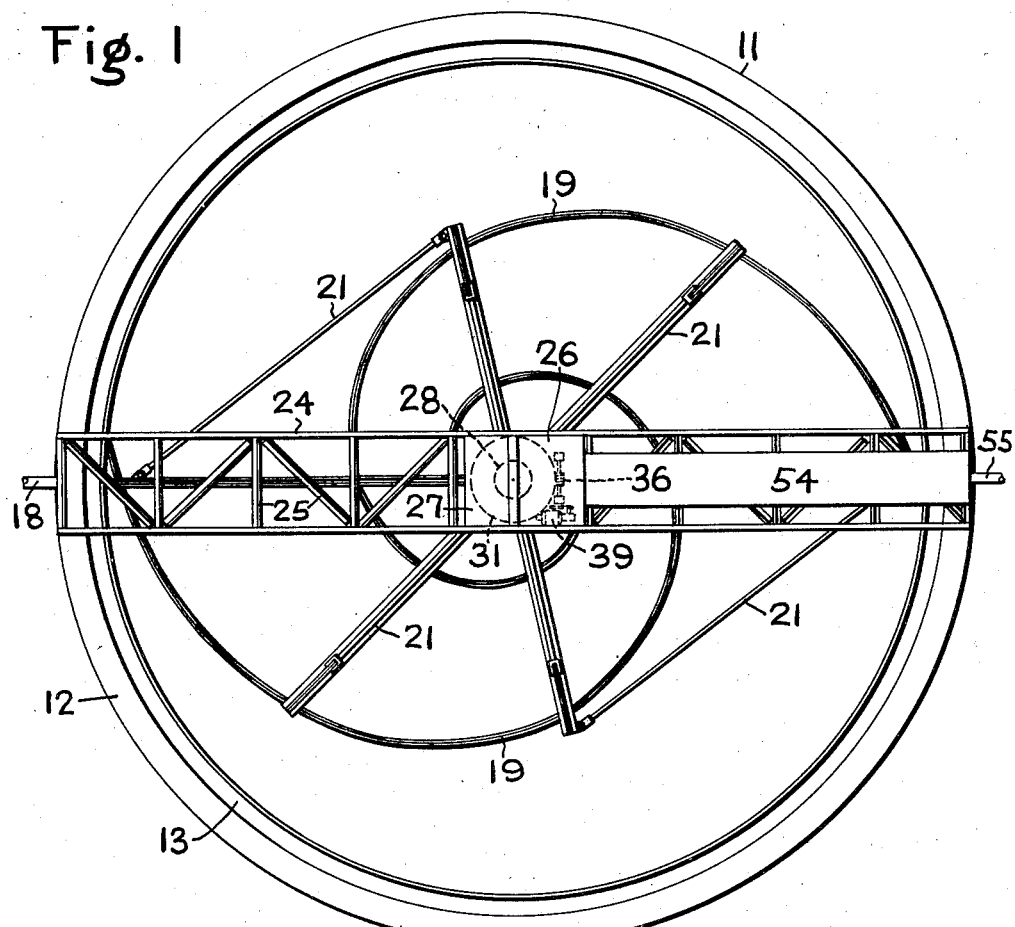
Figure 1 is a plan of a sedimentation apparatus constructed according to the present invention.
Figure 2:
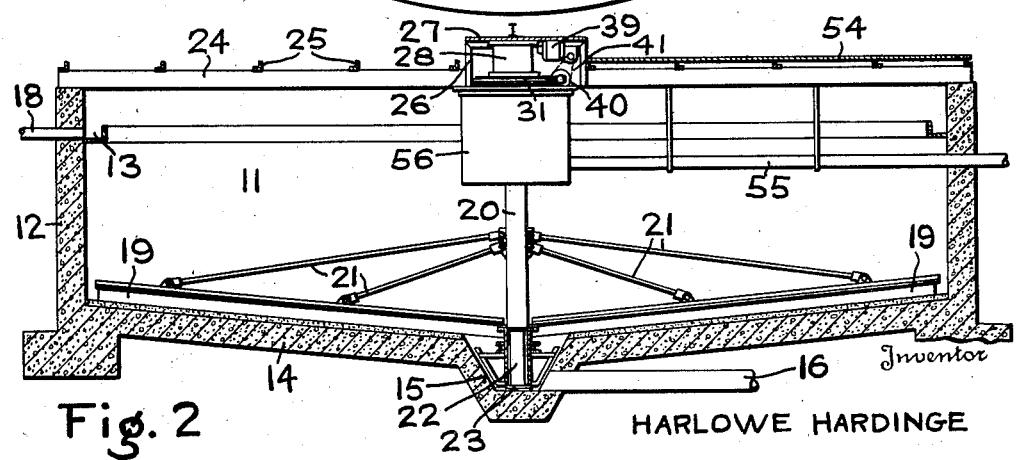
Fig. 2 is a vertical transverse section of the apparatus shown in Fig. 1.

Referring to the drawings and especially to Figs. 1 and 2, the improved sedimentation apparatus may comprise a tank 11 for holding the liquid from which solids in suspension are to be removed. The tank 11 is shown as being circular in form and constructed from concrete or other cementitious material, however, it will be understood that the tank may be constructed from any other suitable material and have any other configuration when so desired.

The tank 11 has a side wall 12 which is formed with an overflow trough 13, and an inclined bottom 14 which slopes downwardly toward the center of the tank.

Solids settling to the bottom 14 by sedimentation take the form of sludge which is raked or impelled toward a bottom discharge hopper 15 from which the sludge is removed through a discharge pipe 16.

An effluent pipe 18 is connected to the trough 13 for the purpose of carrying off the liquid from said trough.

For the purpose of raking or impelling the sludge on the bottom 14 toward the hopper 15, I prefer to use a scraping device comprising a plurality of rakes or plows 19 which are supported from a central vertical rotatable support or torque tube 20. Any convenient form of structure may be utilized for supporting the rakes or plows 19 and this structure may take the form of bracing 21 which connects said rakes or plows 19 with said torque tube 20.

As shown in Figs. 1, 2, 3 and 4, the torque tube 20 surrounds an upstanding column 22 located in the center of the tank 11. The torque tube 20 is spaced a suitable distance from the column 22, so as to rotate freely and also permit vertical movement of the scraping device with respect to said column.

Preferably the column 22 is constructed from a suitable length of pipe, the bottom of the column being supported by suitable means, indicated at 23, Fig. 2, secured to the bottom of the tank 11.

The top of the column 22 serves as a support for a framework 24 which extends diametrically across the top of the tank in the form of a bridge.

The framework or bridge 24 is preferably constructed from structural steel and is considerably lighter in weight than the trusses or frameworks heretofore employed with sedimentation apparatus of the type falling within the scope of the present invention.

As shown in Figs. 1, 2, 3 and 4, the framework or bridge 24 may comprise a pair of parallel channels or beams which are spaced apart a suitable distance and which straddle the column 22 and the driving mechanism for the scraping device to be hereinafter described. The channels or beams are reinforced and tied together by suitable bracing 25.

Intermediate the ends of the framework or bridge 24, there is a superstructure 26, also preferably constructed from structural steel. The superstructure 26 is mounted on the central column 22 and also connected to the framework or bridge 24, as shown clearly in Figs. 3 and 4.

The superstructure 26 constitutes a support for the driving means for the scraper device, and said superstructure may include a plate 27 mounted on top of the column 22 and forming a platform that covers the driving mechanism.

Depending from the plate 27 and surrounding the upper portion of the column 22, is a tubular member 28. This tube extends downwardly from the plate 27 a suitable distance and its lower edge has secured thereto an outwardly extending ring which constitutes a flange 29.

Underlying the flange 29 is a large bull ring, in the form of a worm wheel 31, which is driven by suitable mechanism to be hereinafter described.

The worm wheel 31 carries the whole load of the scraping device, as constituted by the rakes 19, torque tube 20, and associated parts, and in order to permit free rotation of the worm wheel 31 and also to transmit the load to the tubular member 28 and superstructure 26, an anti-friction device, such as a ball bearing 32 is provided.

In the present instance the bearing 32 is shown as comprising an annular member 30 having an outwardly extending flange 34 formed thereon, said member also having formed thereon an annular groove 35 for the balls of the bearing 32.

The balls of the bearing 32 are disposed between the flange 34 and a flange 33 formed on the inner periphery of the worm wheel 31. The flange 33 underlies the flange 29, and in order to clamp the parts together, the annular member 30 is detachably fixed to the flange 29 by means of a plurality of bolts 17.

Since the worm wheel 31 is clamped between members 29 and 30, these members constitute thrust collars for retaining said worm wheel in position should the scraper device and the parts operatively connected thereto have a tendency to tilt.

Figure 3:
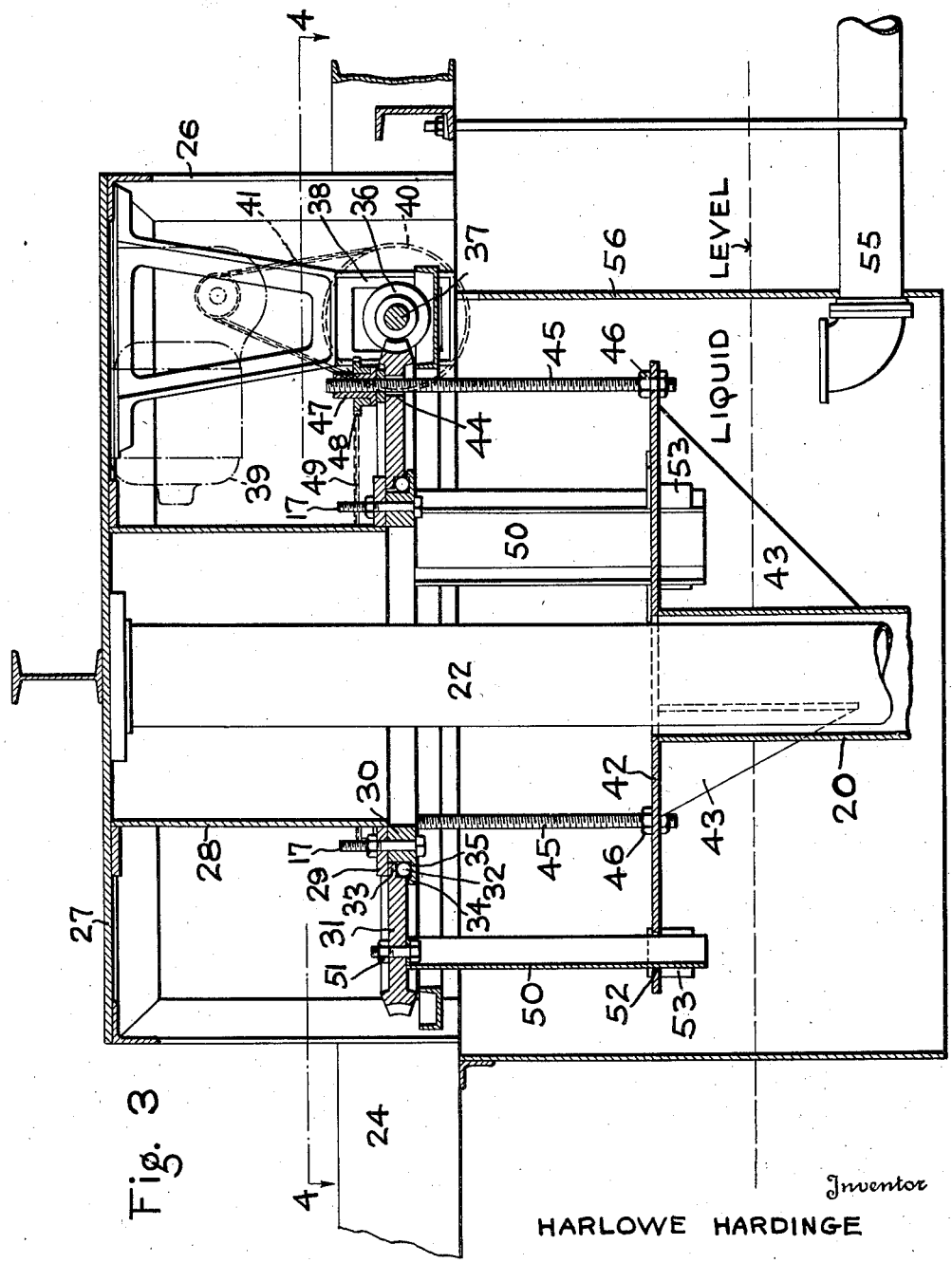
Fig. 3 is an enlarged vertical section of one form of supporting and rotating mechanism for the sludge discharge rakes.
Figure 4:
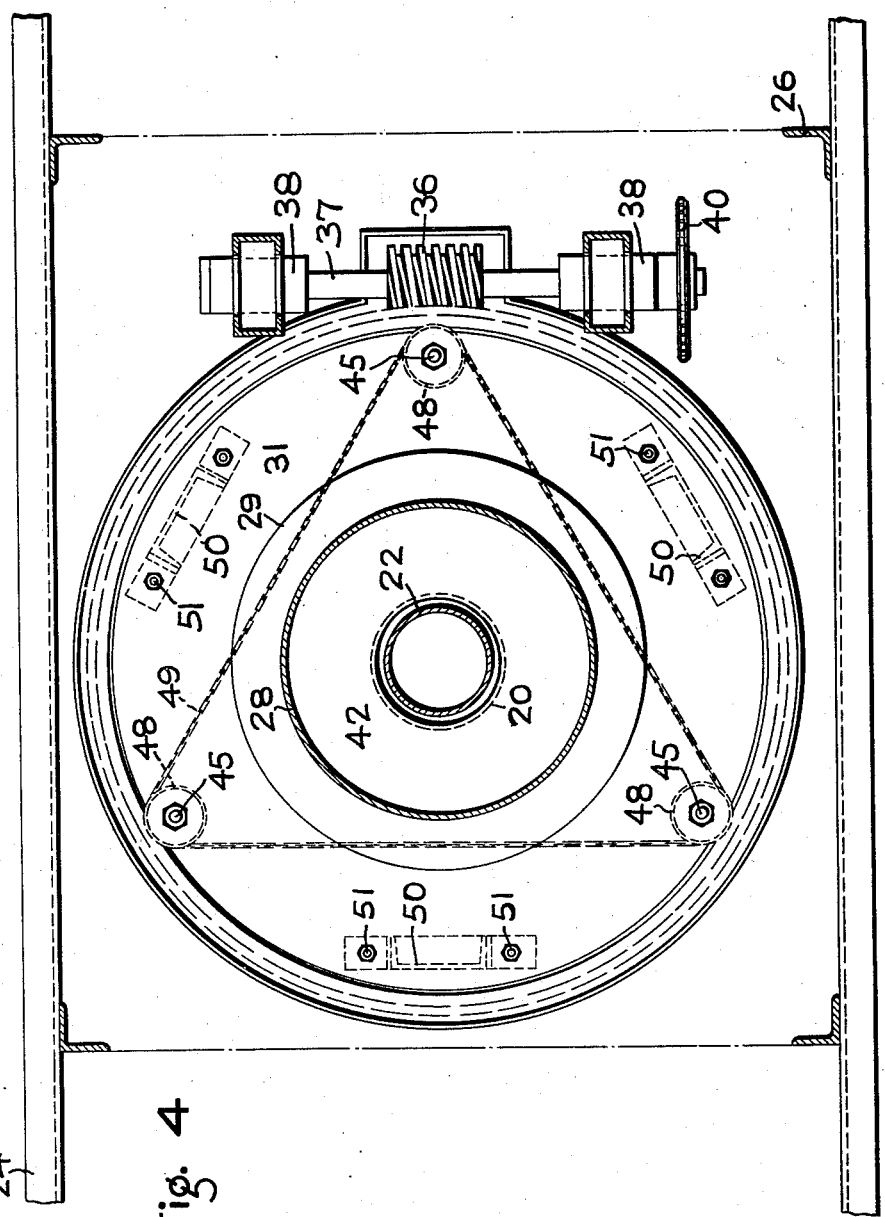
Fig. 4 is a horizontal section taken on the line 4—4 of Fig. 3.

As shown in Figs. 3 and 4, the worm wheel 31 is in meshing relationship with a worm gear 36 on a horizontally disposed shaft 37. The shaft 37 is mounted in bearings 38 carried by the superstructure 26.

The driving mechanism includes an electric motor 39 which is mounted on the superstructure 26. The motor 39 is of the well known type of gear motor having speed reducing gears built therein, and said motor is operatively connected to the worm gear 36 by a chain 41 which drives gear 36 through a sprocket 40 on shaft 37. Through the driving connection between motor 39 and worm gear 36, the worm wheel 31 will be driven comparatively slowly so as to effect rotation of the scraping device at the desired rate of speed. In this connection it should be noted that the rakes of sedimentation apparatus of the type falling within the scope of the present invention are adapted to be rotated comparatively slowly, usually requiring from six minutes to thirty minutes for a revolution around the tank 11.

Figure 5:
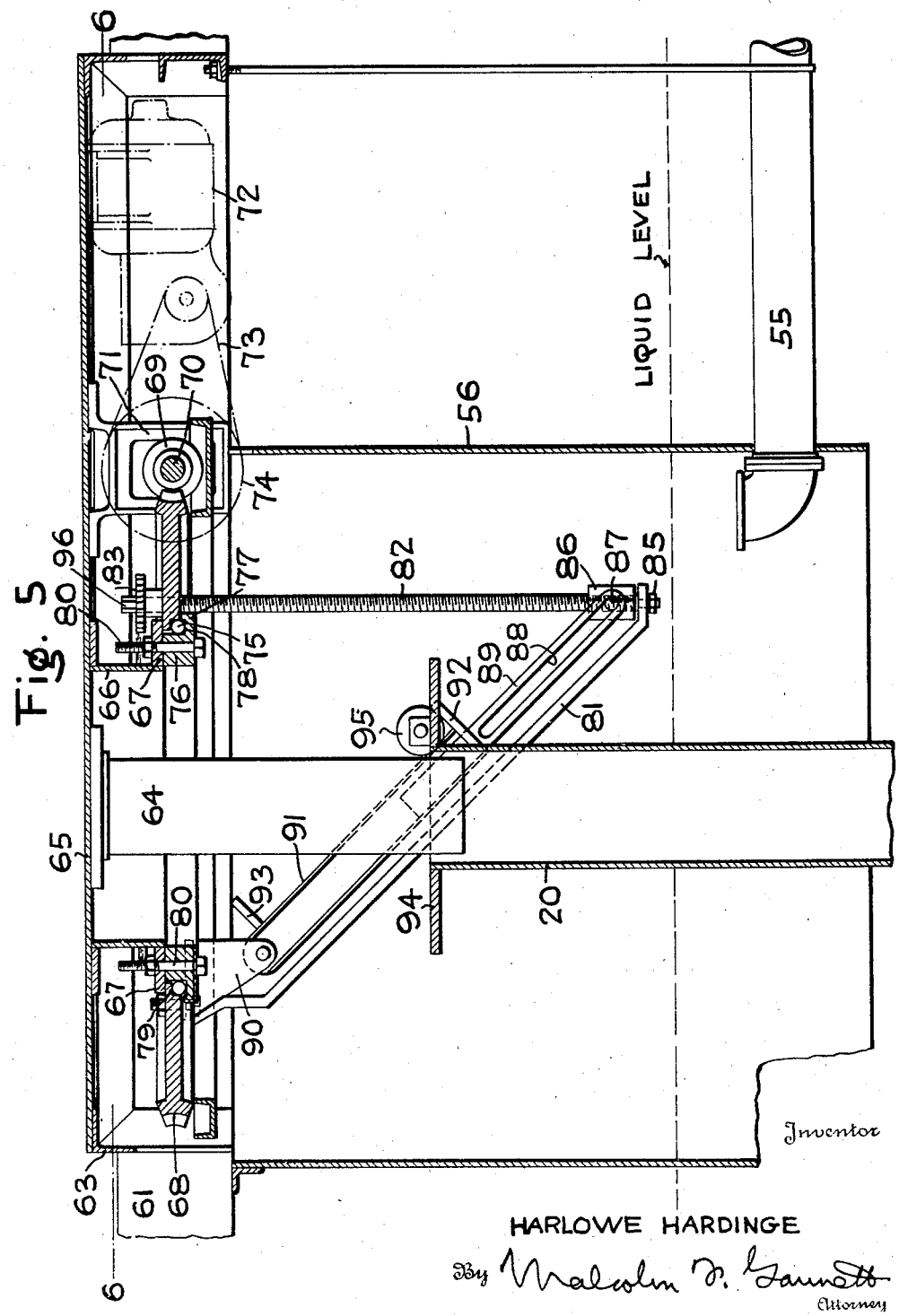
Fig. 5 is a view similar to Fig. 3 of another form of mechanism for supporting and rotating the sludge discharge rakes.
Figure 6:
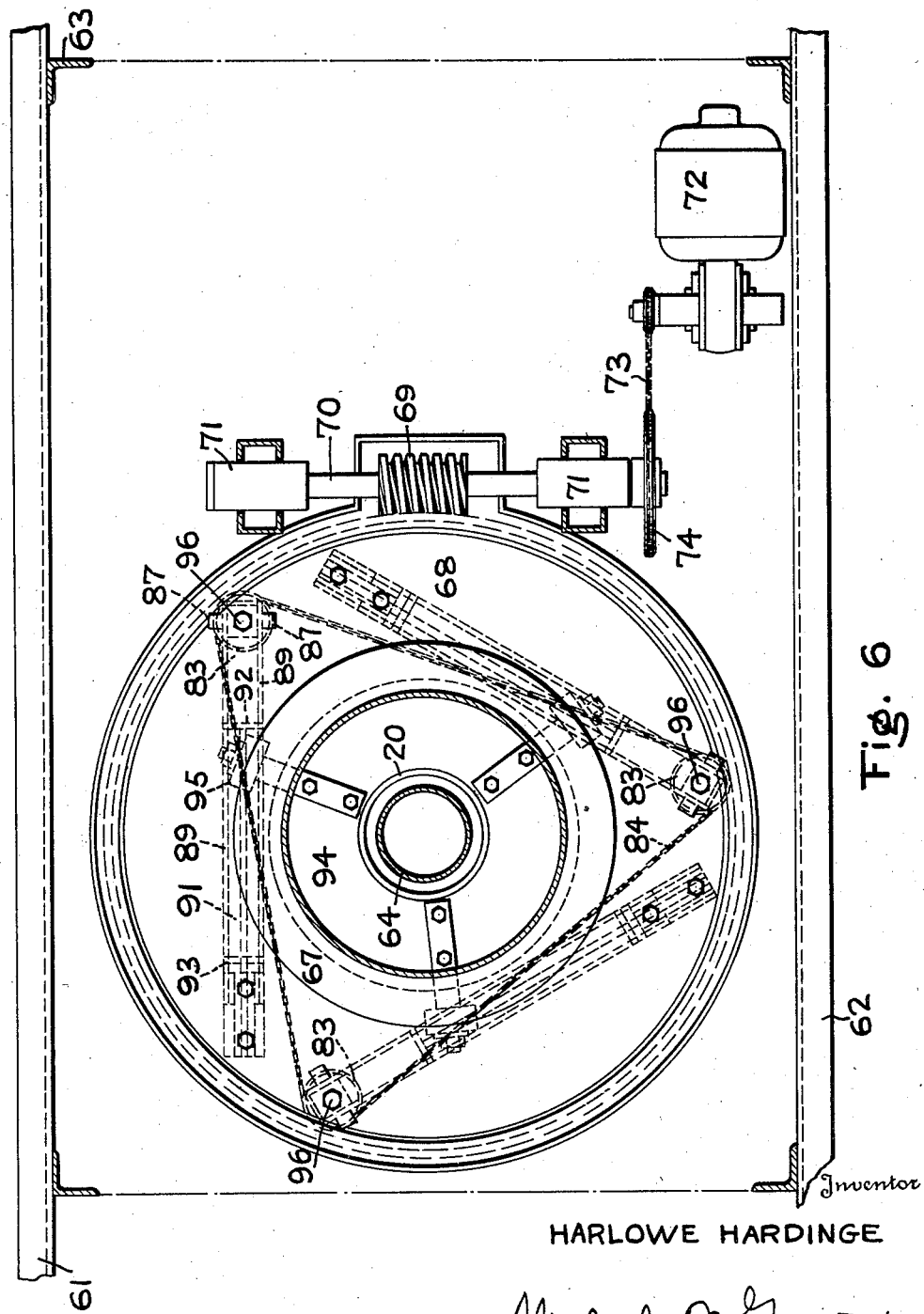
Fig. 6 is a horizontal section taken on the line 6—6 of Fig. 5.

For the purpose of operatively connecting the worm wheel 31 to the sludge scraping device, I have in the instant case shown two forms of structure, one form of structure being shown in detail in Figs. 3 and 4, and the other form of structure being shown in Figs. 5 and 6.

The form of the invention shown in Figs. 3 and 4 for operatively connecting the driving element with the scraping device will now be described.

The upper portion of the torque tube 20 is formed with a substantially horizontally disposed plate 42 which may be rigidly secured to said torque tube by means of a plurality of braces 43.

At suitable intervals the worm wheel 31 is formed with openings 44, three such openings being provided in the present instance, as will appear from Fig. 4.

Mounted in each opening 44, is an elongated threaded rod 45 having its lower end fixed to the plate 42 by nuts 46, and its upper end extending above the worm wheel 31 a suitable distance, when the parts are in the position shown in Fig. 3, with the rakes of the scraping device resting on the bottom of the tank 11. The rods 45 are threaded their entire length for a purpose to be hereinafter described.

Threaded onto the upper portion of each rod 45 and bearing against the upper surface of the worm wheel 31, is a nut 47 on which is fixed a sprocket 48. An endless chain 49 is mounted on all of the sprockets 48 for a purpose to be hereinafter more fully described.

It will be observed that, due to the manner of suspending the scraping mechanism from the drive element or worm wheel 31, by means of the rods 45, above described, said rods are under tension.

Since a considerable torque is developed when the worm wheel 31 and the scraping mechanism suspended therefrom are rotated, suitable means should be provided for relieving the rods 45 of torque. Therefore, in the present embodiment of the invention I utilize a second series of members 50 which depend from the worm wheel 31 and are operatively connected with the scraping mechanism for the purpose of taking up the torque between the worm wheel 31 and the scraping mechanism.

Each torque member 50 may comprise a bar in the form of a channel or I-beam, a channel being shown in Figs. 3 and 4. The upper ends of these bars are rigidly secured to the worm wheel 31, as indicated at 51, and the lower ends of the bars 50 extend downwardly and pass through suitable openings 52 formed in the plate 42. The openings 52 may be reinforced by shims or plates 53. The openings 52 should preferably be so constructed as to permit free sliding movement of the bars 50 therethrough, so that the scraping mechanism can be raised or lowered, either under a loaded or a no load condition, with a minimum amount of friction between the bars 50 and the edges of the openings 52.

A walkway 54 is mounted on one half of the framework or bridge 24, said walkway extending from the periphery of the tank 11 inwardly to the superstructure 26, as shown in Fig. 1, so as to provide means for enabling an operator to easily reach the mechanism at the center of the tank.

The feed may be brought in by a radial feed launder so that it is fed to the apparatus centrally thereof.

In the present instance the incoming liquid is shown as being conveyed through an influent pipe 55 which underlies the walkway 54 and is supported from the framework or bridge 24, as shown in Figs. 2 and 3.

The inner end of pipe 55 terminates within a relatively large cylindrical baffle 56 which surrounds the upper portion of the torque tube 20 and extends downwardly into the liquid in the tank 11 a suitable distance, as shown in Fig. 3. The bottom of the baffle 56 is open.

The liquid discharged from pipe 55 flows downwardly through the open bottom of the baffle 56 into the main portion of the tank 11.

Since the feed being delivered by the pipe 55 has considerable velocity, by providing the baffle 56 the turbulent liquid flowing out of the end of the pipe 55 will be stilled within said baffle in such a manner that the force of the liquid passing out through the bottom of the baffle 56 will be reduced to such an extent that the quiet or still liquid in the tank 11 will not be agitated or disturbed by the incoming liquid feeding into the tank.

In operation, the liquid with its solids in suspension to be clarified or thickened by sedimentation is flowed into the sedimentation tank 11 in a continuous manner and the clarified liquid is flowed therefrom as effluent in a continuous manner. Solids settling out of the liquid fall to the bottom of the tank 11 in the form of sludge and are collected by the rakes or plows 19 which are moved by the central vertical element or torque tube 20, driven from the motor 39 through worm gear 36, worm wheel 31 and the connection between worm wheel 31 and plate 42 of tube 20 provided by rods 45 and torque members 50. Movement of the rakes or plows 19 over the bottom 14 of the tank 11, causes the settled sludge to be conveyed to the sludge discharge hopper 15, from which the sludge is withdrawn through pipe 16 in any approved manner.

During the operation of the apparatus, as above described, it frequently occurs that the movement of the rakes or plows 19 over the bottom 14 of the tank 11 is resisted, due to several conditions, such as when the settled sludge becomes too heavy for the rakes, or there are obstructions of some kind in the tank, or, after a period of idleness, the solids settle down and compact to such extent as to prevent ready movement of the rakes. Therefore, when the movement of the rakes or plows is resisted, in order to prevent damage, bending, or breakage thereof, the rakes should be raised up above the point of resistance.

Accordingly, when such conditions occur the rakes can be readily raised upwardly above the obstruction by an operator, in the following manner.

It has been described that the upper ends of the rods 45 carry nuts 47. Since the rods 45 are carried by the worm wheel 31 they are carried around with said worm wheel as it slowly rotates, and, therefore, it is possible for an operator to engage each nut 47, as it moves past his position on the platform 27, with a suitable wrench or other tool and turn the nut in a direction which will draw the rod 45 upwardly. Since all of the nuts 47 are connected by chain 49, the turning of one nut will be transmitted simultaneously to all of the nuts 47 by said chain, and consequently all of the rods 45 will be simultaneously drawn up a corresponding distance as is the nut being turned. When the nut 47 which the operator has engaged with a wrench has moved away from the operator a distance too far to be turned by the wrench, the wrench can be removed from such nut and then be applied to the succeeding nut, and this operation can be repeated until the scraping mechanism has been lifted a distance for the rakes or plows 19 to clear the obstruction or impedance.

Referring now to Figs. 5 and 6, a slightly different form of the invention is shown, in which in addition to raising the scraping mechanism manually, as has just been described, said scraping mechanism will be automatically raised when an abnormal resistance is encountered.

Only the upper portion of the torque tube 20 is shown in Fig. 5, since the rake or plow structure may be similar to that shown in Figs. 1 and 2.

In this form of the invention the bridge or framework which extends across the top of the tank may comprise parallel channels or beams 61, 62, which are spaced apart a suitable distance so as to straddle the driving mechanism and associated parts of the scraping device.

Overlying the torque tube 20 is a superstructure 63, preferably constructed from structural steel. The superstructure 63 is carried by the beams 61 and 62, and has a flat top 65 which constitutes a platform.

Depending from the top 65 is a rod or stem 64, which extends downwardly into the hollow torque tube 20 a suitable distance, as shown in Fig. 5.

Since the torque tube 20 is preferably formed from a section of pipe or tubing of suitable diameter, the rod or stem 64 may also be formed from a suitable length of pipe or tubing of a diameter less than the interior diameter of the torque tube 20, so that said torque tube will be free to move with respect to the rod or stem 64.

The purpose of the rod or stem 64 is to provide means for retaining the torque tube 20 in upright position and prevent tilting movement of the scraping mechanism, and, therefore, the upper end of said rod or stem is rigidly secured to the underside of the top 65 of the superstructure 63.

Depending from the top 65 and surrounding the upper portion of the rod or stem 64, is a tubular member 66, having a flange 67 formed around its lower edge and extending outwardly therefrom.

Underlying the flange 67 is a large worm wheel 68 which is in meshing relationship with a worm gear 69 on a horizontally disposed shaft 70. The shaft 70 is mounted in bearings 71 carried by the superstructure 63.

The driving mechanism includes an electric motor 72 which may be of the well known type of gear motor having speed reducing gears built therein, and said motor is operatively connected to the worm gear 69 by a chain 73 which drives gear 69 through a sprocket 74 on shaft 70.

It will be understood that through the driving connection between motor 72 and gear 69, the worm wheel 68 will be driven at the desired speed to effect a comparatively slow rotation of the scraping mechanism as has been heretofore described.

Since the worm wheel 68 carries the whole load of the scraping mechanism, it is of advantage to transmit the load to the tubular member 66, through an anti-friction device, such as a ball bearing 75.

In Fig. 5 the bearing is shown as comprising an annular member 76 having an outwardly extending flange 77 formed thereon, said member also having a groove 78 formed in its flanged portion 77 for the balls of the bearing 75. The balls of the bearing 75 are disposed between the flange 77 and a flange 79 formed on the inner periphery of the worm wheel 68. Flange 79 underlies the flange 67 and in order to clamp the parts together, the annular member 76 is detachably secured to the flange 67 by means of bolts 80. Members 67 and 76 constitute thrust collars for retaining the worm wheel 68 in position should the scraping mechanism have a tendency to tilt.

Depending from the worm wheel 68 is a plurality of inclined members 81, three being shown in the present instance. The members 81 are rigid and their lower ends are formed to receive the lower ends of a plurality of substantially vertically disposed threaded rods 82.

The rods 82 have their upper portions mounted in openings formed in the worm wheel 68, and above said worm wheel, the rods 82 have fixed thereon sprockets 83. The sprockets 83 have formed thereon heads 96 adapted to receive a wrench or other suitable tool so that said sprockets can be turned. An endless chain 84 is mounted on all of the sprockets 83 so that all of the rods 82 can be simultaneously rotated. The rods 82 are threaded for the portion of their length extending between the underside of the worm wheel 68 to the portion of the members 81 in which the lower ends of said rods are mounted.

The lower ends of the rods 82 are mounted in suitable openings formed in the extremities of the inclined members 81 and nuts 85 are applied to the extremities of said rods, as shown in Fig. 5.

In this form of the invention the rods 82 are not adapted to move vertically with respect to the worm gear.

Mounted on each rod 82 is a nut or threaded sleeve 86, which is adapted to travel up and down the rod when said rod is turned.

Each sleeve 86 is formed with diametrically disposed, outwardly projecting pins 87 which are mounted in slots 88 in the lower portions of a pair of spaced inclined arms 89. The sleeves 86 do not rotate, since they are confined between the arms 89. The upper ends of the arms 89 are pivotally mounted in a bracket 90 depending from the underside of the worm wheel 68.

Supported between each pair of arms 89, is an inclined track 91, the lower end of which being formed with an upwardly extending projection 92, and the upper end of which having a similarly formed projection 93.

The upper portion of the torque tube 20 is formed with a substantially horizontally disposed plate 94. Rotatably carried by plate 94, is a plurality of rollers 95, there being one roller for each track 91. Each roller is in rolling contact with the upper inclined surface of each track 91, as shown in Fig. 5, and when the scraping mechanism is in its lowermost position (see Fig. 5) the rollers 95 will be disposed on the lower portions of the tracks 91 and abut the stop provided by the projection 92.

During normal operation of the sedimentation apparatus where the resistance against the rakes or plows is not excessive, the rollers 95 will remain at the bottom of the tracks 91, as shown in Fig. 5, since these tracks are disposed at an angle which is adequate to take care of the normal scraper resistance.

When the resistance against the rakes or plows becomes too high, the scraping mechanism will tend to stop rotating and the tracks 91, pushing against the rollers 95, force said rollers to climb the tracks, thus raising the whole scraping mechanism. Due to the disposition of the plurality of tracks and their associated rollers at equidistant points around the torque tube 20, the raising motion will be vertical and uniform.

If the resistance against the scraping mechanism is uneven, such as one rake or plow taking the whole load, tilting of the scraping mechanism will be prevented by the rod or stem 64.

The rollers 95 will continue to ride up the tracks 91 until the resistance against the scraping mechanism diminishes or ceases altogether, and said rollers will either move further up the tracks or roll down the tracks thereafter, depending upon the amount of resistance against the scraping mechanism.

Normally, if the resistance is due to an overload of solids on the bottom of the tank, the rollers 95 will ride up the tracks until the resistance is diminished and then the scraping mechanism will function to its full advantage and the rakes or plows will gradually cut into the solids on the bottom of the tank 11, which action results in the rollers 95 gradually moving down the tracks toward their normal operating positions thereon.

In this way the operation of the sedimentation apparatus will be fully automatic and much easier for an operator to handle, since it is not necessary to observe the device constantly or be otherwise careful regarding overloads, twisted mechanism, etc.

Furthermore, the provision of the automatic overload raising means for the scraping mechanism permits the use of a motor having lower power than has heretofore been possible to employ with similar devices of a given size, since the resistance never becomes so high as to require more than a predetermined amount of power to drive the scraping device.

There is another distinct advantage in the automatic overload raising means, in that, should the rollers 95 be positioned part way up the tracks 91 and the device becomes stalled, due to power cut-off or otherwise, it is then possible to continue the raising of the scraping mechanism by the manually operated means which I have provided that is associated with the automatically operable overload raising means.

It has been described that the sprockets 83 are formed with heads 96 adapted to be engaged by a wrench or other tool, so that the rods 82 can be rotated. Therefore, when it is desired to manually raise the scraping mechanism, an operator engages the head 96 with a wrench and turns the rod 82. Since all of the rods 82 are connected by the chain 84 and sprockets 83, the turning of one rod will be transmitted simultaneously to all of the rods by said chain, and consequently all of the rods will be rotated simultaneously.

Rotation of the rods 82 causes the nuts or threaded sleeves 86 thereon to move upwardly, and this action swings the inclined arms 89 and also the tracks 91 upwardly, with a result that the rollers 95 are raised. Since the rollers are mounted on the torque tube 20, the scraping mechanism will likewise be raised in a manner similar to that heretofore described in connection with the description of the operation of the form of the invention shown in Figs. 3 and 4.

With the nuts or sleeves 86 disposed upwardly of the rods 82, when it is desired to lower the scraping mechanism, the rods 82 can be turned in the opposite direction to the direction in which they were turned to effect upward swinging movement of the arms 89, and such action will move the sleeves 86 downwardly towards the position shown in Fig. 5, and consequently, the parts supported from said sleeves will be lowered.

As shown in Fig. 5, radial feed pipe 55 terminates in baffle 56 of the same type heretofore described in connection with the preferred form of the invention.

While in the foregoing description the term "torque tube" has been employed in referring to the member 20, it will be understood that any other suitable structural member may be utilized in constructing this portion of the sludge rakes supporting means without departing from the invention.

Changes may be made in the details of construction and in the arrangement of the parts above described within certain limits without departing from the spirit of the invention.

Having thus described my invention, what I claim is:

1. A sedimentation apparatus comprising a tank having a discharge for solids, a scraping device rotatably mounted in the tank and adapted to travel over the bottom thereof to impel settled solids towards the discharge, a drive element for said scraping device comprising a ring gear and means for operating the same, a plurality of rods operatively connecting said ring gear with said scraping device, and means for vertically moving said rods for bodily raising said scraping device.

2. A sedimentation apparatus comprising a tank, sludge scraping mechanism within the tank comprising a rotatable supporting means disposed centrally in the tank and rakes supported from said means for scraping solids on the bottom of the tank, a bridge extending diametrically across the top of the tank, a tubular member rigidly secured to said bridge and overlying the top of said rotatable supporting means, an anti-friction bearing carried by said tubular member, a gear wheel supported by said bearing, a motor supported from said bridge and operatively connected to said gear wheel for rotating the same, said gear wheel being disposed in spaced relation above the top of said rotatable supporting means when said rakes are at the bottom of the tank, and means depending from the gear wheel for connecting the rotatable supporting means to said gear wheel.

3. A sedimentation apparatus comprising a tank, sludge scraping mechanism within the tank comprising a rotatable supporting means disposed centrally in the tank and rakes supported from said supporting means for scraping solids on the bottom of the tank towards a discharge, a bridge extending diametrically across the top of the tank, a superstructure carried by said bridge and overlying said rake supporting means, a tubular member rigidly secured to said superstructure and extending downwardly therefrom and terminating above the top of said rake supporting means, a gear wheel rotatably mounted on said tubular member, a motor supported from said superstructure and operatively connected to said gear wheel for rotating the same, and means connecting said gear wheel with said rake supporting means for moving the supporting means and the rakes carried thereby towards and away from said gear wheel.

4. A sedimentation apparatus comprising a tank having a discharge for solids, a scraping device mounted in the tank and adapted to travel over the bottom thereof to impel settled solids towards said discharge, a drive mechanism for said scraping device, a plurality of threaded rods connecting said drive mechanism and said scraping device, and means connecting said rods for simultaneously operating the same to bodily move said scraping device away from the bottom of the tank, said last named means being also operable manually independent of said drive mechanism to effect movement of said scraping device.

5. A sedimentation apparatus comprising a tank having a discharge for solids, sludge scraping mechanism within said tank for scraping solids on the bottom of the tank towards said discharge, a bridge extending across the top of the tank, a support member secured to said bridge and having an outwardly extending annular flange thereon, a ring gear having its inner periphery encircling said support member and underlying said annular flange, a ball bearing having an annular member secured to said support member and underlying the inner periphery of said ring gear, said flange and the annular member of said ball bearing constituting thrust means for said ring gear to prevent tilting thereof, and means operatively connecting said ring gear and said sludge scraping mechanism.

6. A sedimentation apparatus comprising a substantially circular tank, raking means for impelling solids toward the center of the tank, means disposed centrally of the tank and supporting said raking means, a bridge extending diametrically across the top of the tank, a superstructure carried by said bridge and overlying the rake-supporting means, a tubular member rigidly secured to said superstructure and extending downwardly therefrom, a worm wheel rotatably mounted on said tubular member, a motor supported by said superstructure and operatively connected to said worm wheel for rotating the same, means operatively connecting said worm wheel with said rake-supporting means, and an influent pipe extending from the side of the tank toward the center thereof, said pipe being located below and supported by the bridge.

HARLOWE HARDINGE.